United States Patent [19]
Rowley

[11] Patent Number: 5,741,458
[45] Date of Patent: *Apr. 21, 1998

[54] METHOD OF FORMING A WATER HEATER TUBE

[76] Inventor: William Rowley, 35 Wilding Chase, Chagrin Falls, Ohio 44022

[*] Notice: The term of this patent shall not extend beyond the expiration date of Pat. No. 5,622,670.

[21] Appl. No.: 588,807

[22] Filed: Jan. 19, 1996

[51] Int. Cl.$^6$ .............................. B29C 71/04; B29C 57/02
[52] U.S. Cl. ..................... 264/494; 264/156; 264/296; 264/322; 264/323
[58] Field of Search ........................... 264/156, 323, 264/322, 296, 494; 425/393, DIG. 218

[56] References Cited

U.S. PATENT DOCUMENTS

| | | | |
|---|---|---|---|
| 4,209,597 | 6/1980 | Bremholt | 525/376 |
| 4,316,870 | 2/1982 | Rowley | 264/322 |
| 4,446,084 | 5/1984 | Rowley | 264/40.6 |
| 4,525,136 | 6/1985 | Rowley | 425/384 |
| 4,783,030 | 11/1988 | Imgram | 264/535 |
| 4,964,394 | 10/1990 | Threatt | 126/361 |
| 5,622,670 | 4/1997 | Rowley | 264/494 |

*Primary Examiner*—Jan H. Silbaugh
*Assistant Examiner*—Mark Eashoo
*Attorney, Agent, or Firm*—Oldham & Oldham Co., LPA

[57] ABSTRACT

A process for the fabrication of a thermoset water heater tube is described. By shifting to a thermoset rather than a thermoplastic, a much higher heat distortion temperature is achieved when compared to standard thermoplastic materials such as polypropylene, polyethylene, ABS or PVC. The stress crack resistance is also higher as is the dimensional stability. These desirable properties can be achieved by using a lower cost material, in contrast to a more expensive thermoplastic, and solves the problem of water heater tube failure when dry firing conditions are present. The invention utilizes thermoplastic processing conditions, with subsequent crosslinking to form a thermoset. This combines the best features of both types of materials: (1) the ease of thermoplastic processing; combined with (2) the desirable physical properties of a thermoset.

26 Claims, 5 Drawing Sheets

METHOD OF FORMING A WATER HEATER TUBE

TECHNICAL FIELD

The invention described herein pertains generally to crosslinked polyethylene water heater tubes which can withstand dry firing without significant heat distortion of the polymeric tube and through the inclusion and positioning of the water exit bores in the tube, minimize the scale and/or sediment accumulation at the bottom of the water heater.

BACKGROUND OF THE INVENTION

There have been at least two longstanding problems which have influenced the water heater industry. One is the tendency of dissolved solid particles to precipitate out of the water. These particles accumulate at the bottom of the tank causing adverse operation and tank longevity. Various means have been employed to minimize this sedimentation problem including expensive and complex electrostatic, electronic and chemical devices or systems.

Another problem has been caused by the shift from metallic inlet water tubes to plastic (i.e., polypropylene and polysulfone) and the associated problem of dry firing of the water heater when no water is present. Since the heat distortion temperature of these polymers is below the temperatures reached when no water is present in the tank, the inlet tube tends to distort and become non-functional for their intended purpose.

What has been needed in the industry is a plastic inlet tube which has a higher heat distortion temperature, and yet additionally has a memory which will permit the tube to regain essentially its original shape subsequent to the removal of the heat source, and which can be configured to minimize scale and/or sediment accumulation at the bottom of the water heater tank.

SUMMARY OF THE INVENTION

In accordance with the present invention, there is provided a crosslinked thermoset polyethylene polymer which has significantly higher heat distortion temperatures than standard thermoplastics (e.g., polypropylene, polyethylene, polyvinyl chloride).

It is an object of this invention to provide a process whereby crosslinked polyethylene can be used in water heater inlet tubes in place of polypropylene and polysulfone tubes.

It is another object of this invention to provide an article of manufacture whereinby the water heater can still function in a satisfactory manner even if subject to dry firing conditions.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

2

DETAILED DESCRIPTION OF THE INVENTION

Referring now to the drawings wherein the showings are for purposes of illustrating the preferred embodiment of the invention only and not for purposes of limiting the same, the Figures show cut lengths of plastic tubing upon which a belled end and keyway is formed thereon and the utilization of such pieces, typically fabricated of crosslinked polyethylene, into an inlet water heater tube for use in a conventional water heater.

As seen in the figures, the tubing comprises a top vertically fixed mold (10) and a vertically movable bottom mold (11). The top mold or die (10) includes a central bore (12) and a riser tube (13) secured to the top thereof having an I.D. the same as the I.D. of the bore (12). The lower surface of the top mold is provided with a cylindrical projection (14) projecting centrally therefrom. The lower end of the bore is provided with a conical flaring portion (15), the lower end of which is provided with a small radius seen at (16). Radially beyond such radius, the bore is terminated in an axially extending edge (18).

The bottom mold (11) includes a body (20) which may include an annular passage (21) for the circulation of cooling medium therethrough. The body (20) is threaddly connected to rod (22) of a piston-cylinder assembly and adjustably locked thereto by the nut (23). The top of the mold or die (11) is provided with a central recess shown generally at (25) which includes an upper cylindrical portion (26) into which the axial projection (14) of the top mold is designed closely to telescope. The lower end of the cylindrical portion is provided with a shoulder (27) separating the cylindrical portion of the recess from circular bulb forming cavity (28). The lower circular bulb forming cavity is provided with a horizontal circular axially facing end face (29) which is selectively larger in diameter than the diameter of the bore (12). Projecting axially from the bottom of the recess (25) is a guide rod (30), the top of which is provided with a pilot nose or pointed portion (31).

Figures 1, 2, 3:
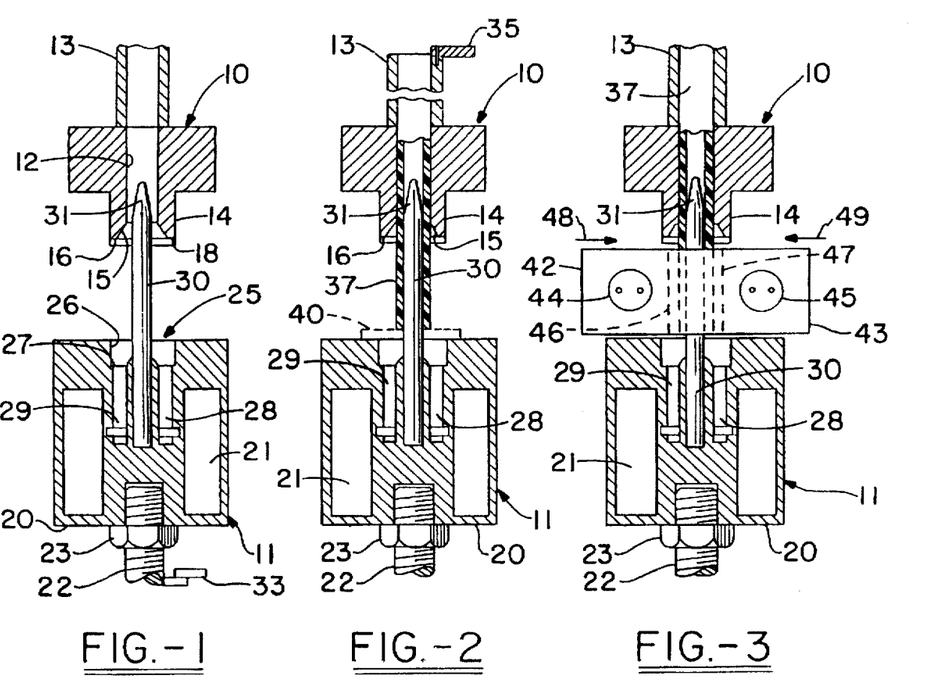
FIG. 1 is a fragmentary vertical section of the dies employed to form the tubing in accordance with the present invention, such dies being shown separated from each other.
FIG. 2 is a view similar to FIG. 1 showing the tubing inserted through the female die, partially inserted on the male die and projection a predetermined distance from the former.
FIG. 3 is a view similar to FIGS. 1 and 2 showing the tube projection portion being heated.

In FIG. 1, the top and bottom molds or dies have been brought to an intermediate position relative to each other in that the bottom mold (11) has been brought to an intermediate elevated position and the position may be determined by a retractable adjustable stop as seen at (33) in FIG. 1. In such position, the pilot nose of the guide rod (30) projects into the bore (12) as shown.

Referring to FIG. 2, it will be seen that the top of the guide tube (13) is provided with a back stop seen at (35) which may be pivoted to the top of the guide tube (13) for swinging movement to and from a position clear of the I.D. of such tube or over the I.D. of such tube.

An extruded plastic, preferably polyolefin, and more preferably, polyethylene or crosslinked polyethylene, tube section, cut to a predetermined length, is now inserted downwardly through the guide tube as seen at (37) to project from the lower end of the top mold (10). The dimensions of the tube O.D. and I.D. are such that the tube will fit snugly in the I.D. of the bore (12) with the I.D. of the tube fitting snugly over the O.D. of the rod (30). It is important that the tube (37) project a predetermined distance below the top mold (10). This predetermined distance can be obtained in several ways. When the operator inserts the tube, the operator can insure that the top of the tube is flush with the top of the guide tube (13) and pivoting the back stop (35) over the top of the tube gages the tube against such back stop. In this manner, the tube length may be gaged from the top end to project the predetermined distance noted. Alternatively, a gage bar, shown at (40) may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks (42) and (43) are employed, each provided with electrical heating elements seen at (44) and (45), respectively, to confine the projecting end of the tube (37) therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation, for illustrative purposes only, this temperature would be approximately 700° F.–±25° F. for a time of between 10–30 seconds in the case of polypropylene, approximately 700° F. ±25° F. for a time between 25–45 seconds for polysulfone, and approximately 700° F. ±25° F. for a time between 15–35 seconds for crosslinked polyethylene. The key is to balance temperature and dwell time within the heating blocks. It is well within the skill of those in the art to vary the time and/or temperatures noted to achieve the desired degree of "softness" necessary for further processing.

Figure 4:
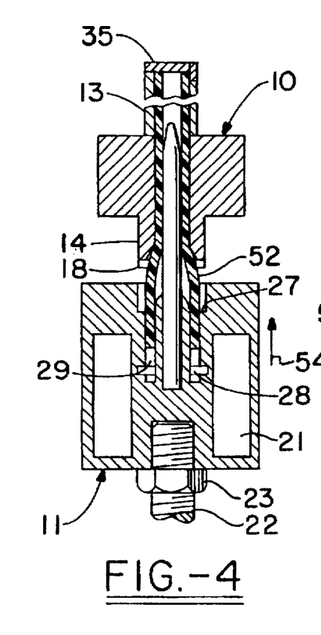
FIG. 4 is a view similar to FIGS. 1–3 showing the dies being brought together.
Figure 5:
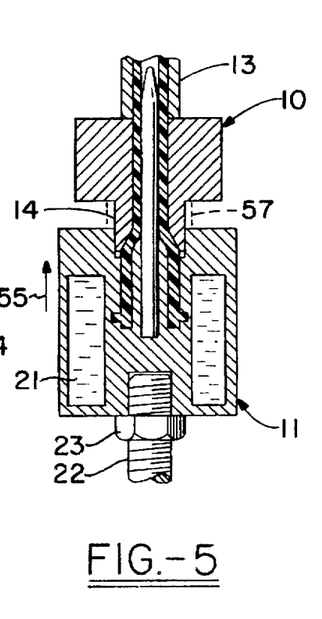
FIG. 5 is a view similar to FIG. 4 showing the dies closed.

After the desired amount of heat is applied, the heating blocks are removed. Depending upon the polymer and/or time and/or temperatures used, a cooling cycle may be employed before the initiation of the next step. If a bottom gage is employed, the gage (40) is also removed and the retractable step (33) is withdrawn. With the back stop (35) in place, the piston-cylinder assembly of the rod (22) is now further extended as seen in FIG. 4 and the projecting end of the tube seats in the bottom face (29) of the bulb forming cavity (28) and begins to form as seen at (52). As the bottom mold (11) moves upwardly as indicated by the arrows (54) and (55) in FIGS. 4 and 5, respectively, the axial projection (14) of the top mold telescopes within the cylindrical recess (26) of the bottom mold. The bottom mold continues upwardly to the position shown in FIG. 5 forming the tube end as indicated. During such movement, the back stop (35) keeps the tube from moving upwardly with respect to the top mold. The piston-cylinder assembly is fully extended until the edge (18) of the top mold engages the shoulder (27). Such edge will tend to bite off or render easily removable any flash formed between the telescoping surfaces of the molds. Alternatively, a stop or gage ring can be provided as seen at (57) to limit the relative movement of the molds to avoid wear on the edge (18). When the molds are fully together as seen in FIG. 5, a cooling medium may be circulated through the passage (21) as seen at (58). While water is preferred, it will be appreciated that the cooling medium could be many other fluids such as oil or a gas. The unique aspect of this process is that during the compression molding, the wall tube is being used as the raw material.

After the mold has been cooled for a predetermined time, the piston-cylinder assembly of the rod (22) is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold (10) would be opened and the part removed from the top mold in a vertical direction.

After the tube is removed, the top mold remains in alignment with the bottom mold and the stop (33) is returned to its position and the piston-cylinder assembly is extended to bring the molds back to the original FIG. 1 position so that the process may be repeated.

It will be appreciated that the tooling illustrated may be either horizontally or vertically oriented and that the recess configurations may be readily altered to form a belled end of varying configurations. Also, the tube holder (13) can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold (10) may be termed the female mold while the moving mold (11) with the guide rod projecting therefrom and holding the I.D. of the tube may be termed the male mold or die.

Figure 6:
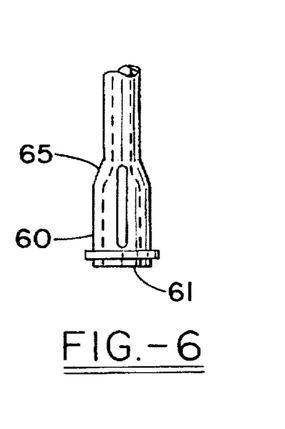
FIG. 6 is a fragmentary elevation of the end of the tube as formed by the process depicted in FIGS. 1–5.

The resultant product is seen in FIG. 6. The plastic tube thus formed includes an integrally formed belled end into which a suitably dimensioned copper fitting for example, could be inserted. The plastic tube thus formed, includes an integrally formed belled surface (60) extending from the end face (61) of the tube to conical neck 65. The end face (61) of the tube has both a larger I.D. and O.D. than the remainder of the tube, but the thickness of all portions of the tube are the same. In a preferred embodiment, a key way (62) is additionally formed as part of the compression molding process, by an appropriate die design modification to that shown previously. The key way typically protrudes about ¼" from the surface of belled surface (60), the key way serving to orient the positioning of the tube in the water heater.

Figure 11:
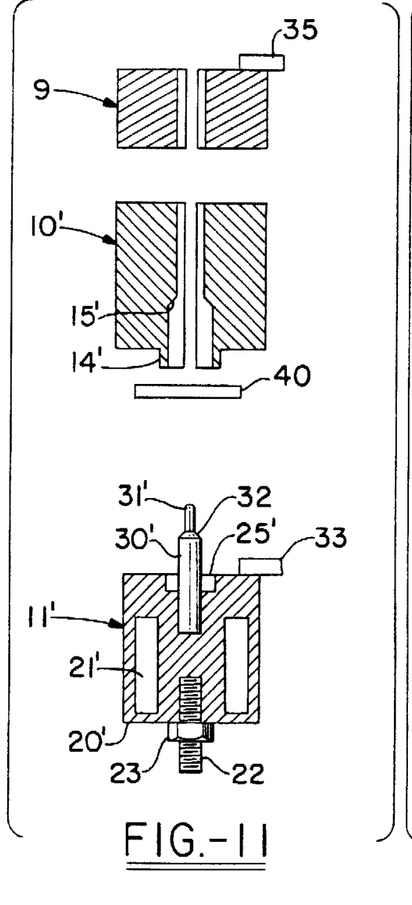
FIG. 11 is a fragmentary vertical section of the dies employed to form the tubing in accordance with the present invention, the dies being shown separated from each other.

As shown in FIG. 11, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die (9), a center vertically-fixed two-piece horizontally operating mold (10') and a vertically moveable bottom mold (11'). The clamping die (9) includes a central bore, the diameter of which is equal to a diameter sufficiently smaller than the diameter of the tube to be belled so as to cause a clamping effect on the tube when the clamp die (9) is closed.

The center vertically-fixed two-piece horizontally operating mold (10') includes a central bore, of the same diameter as the tube to be belled. The lower end of the bore is provided with a conical flaring portion (15), the lower end of which is of a diameter and length equal to the outside diameter and length of the belled end of the tube.

The bottom mold (11') includes a body (20) which may include an annular passage (21) for the circulation of a cooling medium therethrough. The body is threadedly connected to rod (22) of a piston-cylinder assembly and adjustably locked thereto by nut (23). The bottom mold or die (11') is provided with a central recess shown generally at (25) into which the axial projection (14') of the top mold (10') is designed closely to telescope. Projecting from the bottom of the recess (25') is rod (30'), the diameter of the rod at the bottom of the recess of equal diameter to the I.D. of the belled end of the tube and maintained for a distance equal to the depth of the tube bell. Rod (30') terminates at top (31') and is radiused to corresponding conical flaring portion (15) at conical segment (32).

Figure 12:
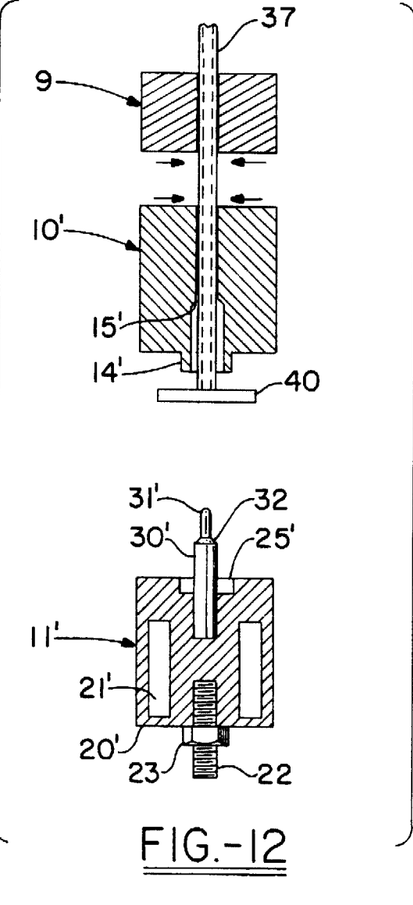
FIG. 12 is a view similar to FIG. 11 showing the tubing inserted through the female die, and projecting a predetermined length therefrom.

In sequenced operation and shown in successive figures, this modified mold and die design is identical in concept, and implementation to that previously detailed and all related discussion is equally applicable to either embodiment. As shown in FIG. 12, extruded plastic (37) is inserted through clamping mold (9) and top mold (10'), resting on tube position stop (40). The two halves of the clamping mold (9) are closed thereby holding extruded plastic (37) firm.

Figure 13:
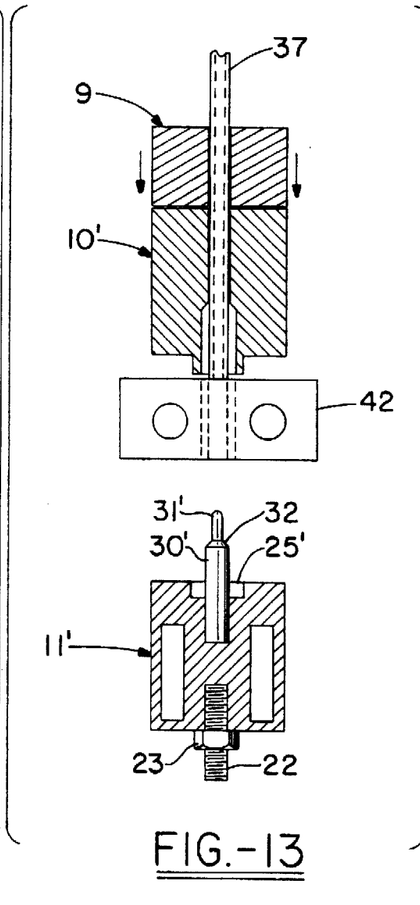
FIG. 13 is a view similar to FIGS. 11 and 12 showing the tube projection portion being heated.

In FIG. 13, clamping mold (9) is moved to a position extending the lower end of the extruded plastic (37) into a cavity in heating blocks (40). The split halves of center mold (10') are closed about the circumference of extruded plastic body (37) during the heating cycle to provide stability to the tube during the heating cycle. Of course it is recognized that the plastic tube could also be pre-heated to the molding temperature and then inserted over the pin and clamped. The heating also does not have to be done inside the heating unit, as many different heating mediums are envisioned to be applicable to this aspect of the invention.

Figure 14:
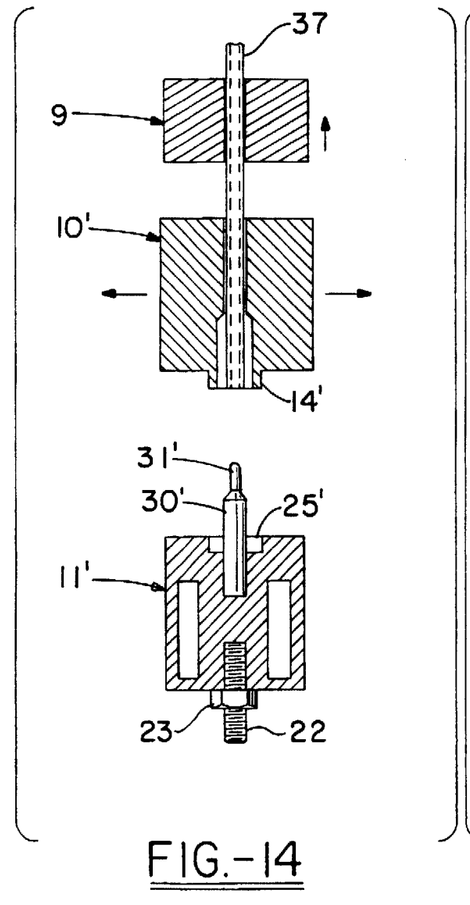
FIG. 14 is a view similar to FIGS. 11–13 showing the clamping die retracting the projecting tubing portion back into the middle die for subsequent belling.
Figure 15:
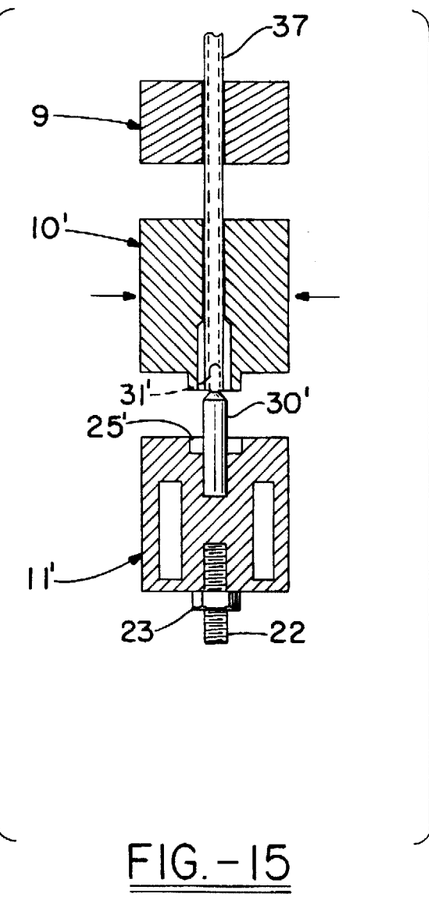
FIG. 15 is a view similar to FIGS. 11–14 showing the dies being brought together.

With the heating cycle completed, center mold (10') is opened and clamping mold (9) returned to its original disengaged position. The heated end of extruded plastic (37) is now positioned in the belled cavity of center mold (10') as shown in FIG. 14. In FIG. 15, the center mold (10') has been closed about extruded plastic (37) and bottom mold (11') moved upward with the pilot nose (31') of guide rod (30') penetrating the heated end of the tube.

Figure 16:
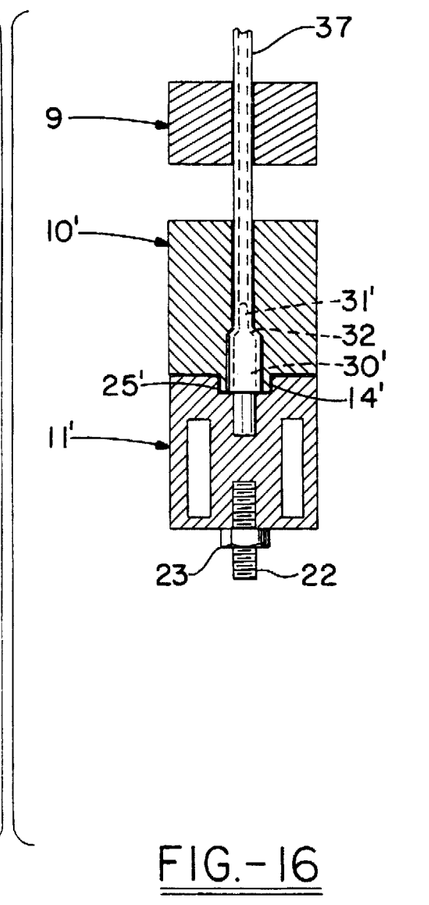
FIG. 16 is a view similar to FIGS. 11–15 showing the dies closed.

In FIG. 16, bottom mold (11') is completed extended, forcing the heated plastic into the cavity created at the connection center mold (10') and bottom mold (11'). After a sufficient period of cooling, all molds are returned to their original positions and the belled tube is then removed from the molds.

Figures 7, 10:
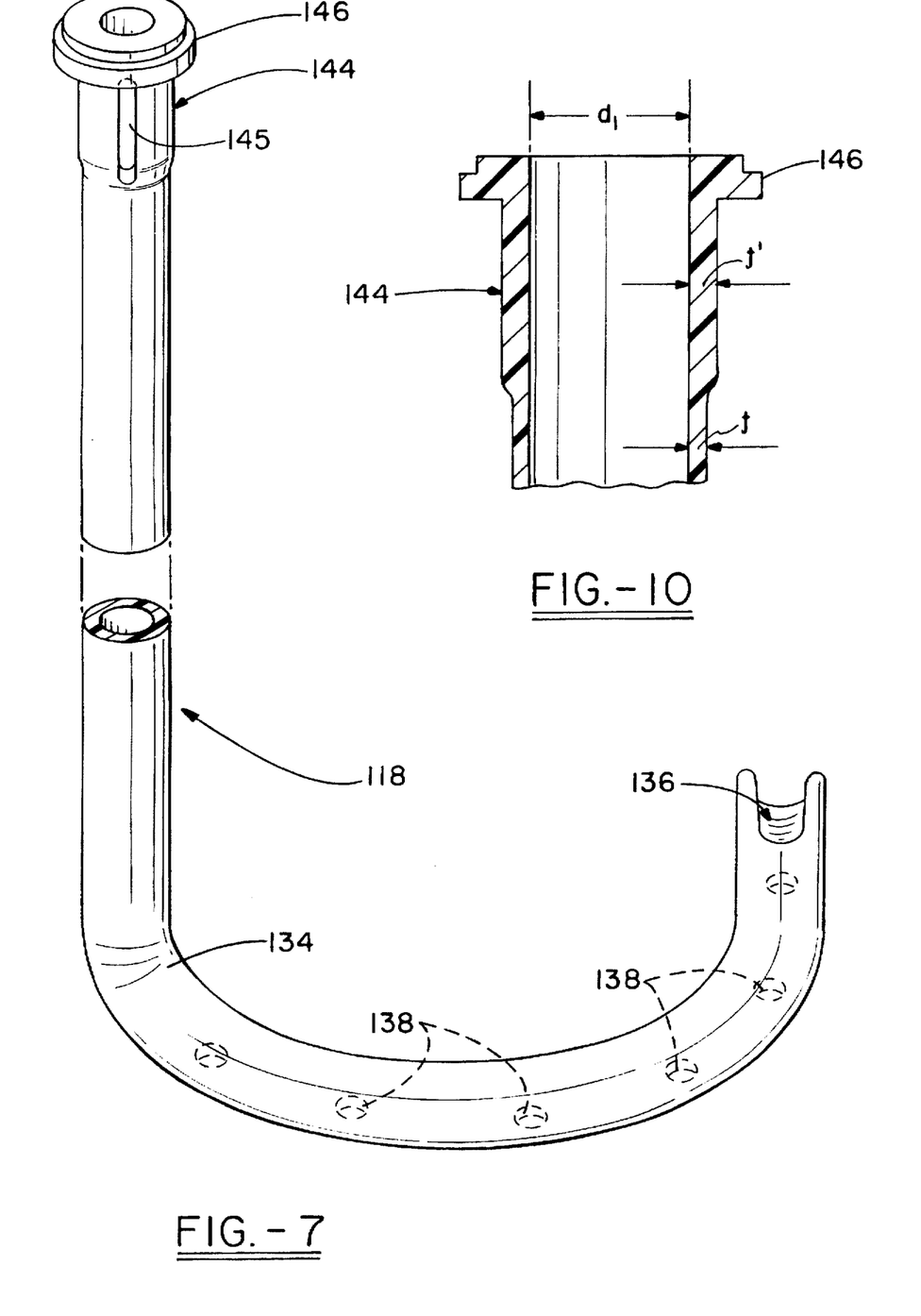
FIG. 7 is a perspective view of the water heater tube made in accordance with the teachings of this invention, wherein it comprises a belled coupling having a wall thickness that is at least the same thickness of the original tube.
FIG. 10 is an enlarged cross-sectional view of a belled coupling end of the heater tube.

FIG. 7 illustrates the completed water heater tube (118) comprising a sealed distal end (136) and belled end (144) having a keyway (145) for positioning purposes inside the water heater. The length of the tube is such as to reside within a water heater. Tube (118) is thus, of unitary construction, of original bore diameter $d_1$) and wall thickness t, which through the process of heating and molding into an appropriately configured die, is shaped into distal end (136) and a belled end (144) of diameter $d_1$, but still at least of thickness t. While the tube wall thickness t, has been shown to be the same throughout, the application is not necessarily limited to such. As shown in FIG. 10, it is possible to fabricate the belled end (144) wherein the wall thickness t' of the belled end, is greater than that of the middle body of the tube. In other words, t'>t. Such a configuration is made by increasing the thickness of the die cavity containing circular bulb forming cavity (28). As discussed previously in relation to a constant wall thickness t, thickness t' will require that tube (37) project an even longer distance below top mold (10) than used when thickness t is desired. This is necessary such that subsequent to the softening of the projecting end of tube (37) via the action of heating blocks (42) and (43), or other heating means, and the dies have been brought together, the larger die void, i.e., bulb forming cavity (28) will be filled with polyolefin, preferably polyethylene.

Figure 8:
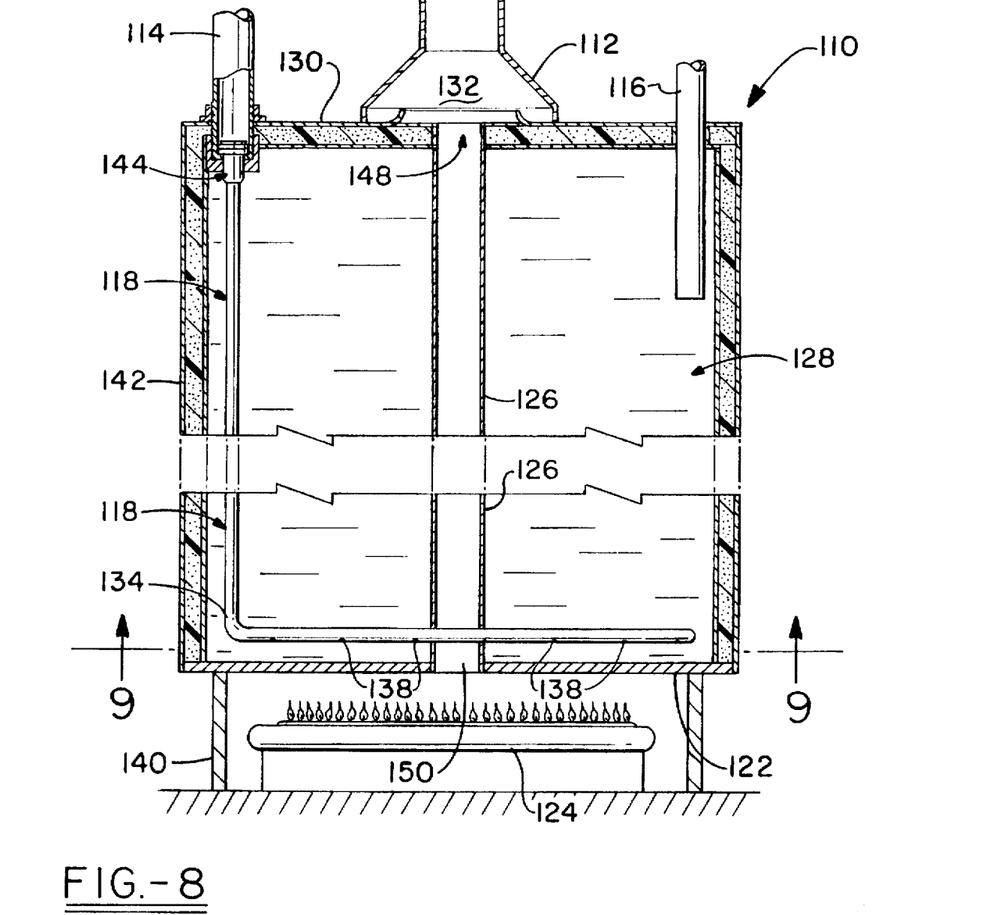
FIG. 8 is a sectional view of a water heater incorporating the heater tube of the invention.

As best seen in FIG. 8, the water heater (110) is comprised of a cold water inlet tube (114) and a hot water exit tube (116). The water heater has an insulated wall (142), a tank top member (130) and a tank bottom member (122) supported by furnace housing (140). In a gas fired water heater, a burner (124) of conventional construction is mounted in the housing (140). Also in a gas fired water heater, tank top (130) and tank bottom (122) are interconnected with at least one upper and lower aligned opening (148) and (150) in which at least one flue tube (126) is mounted. Tank top and bottom members are sealed to the tank wall and to the flue tubes by any suitable means such as welding to form a liquid tight tank having a water heating chamber defined therein (128). Exhaust gases which are generated through the combustion process are exited through tank top (130) into flue (112) for exit through a chimney (not shown).

Figure 9:
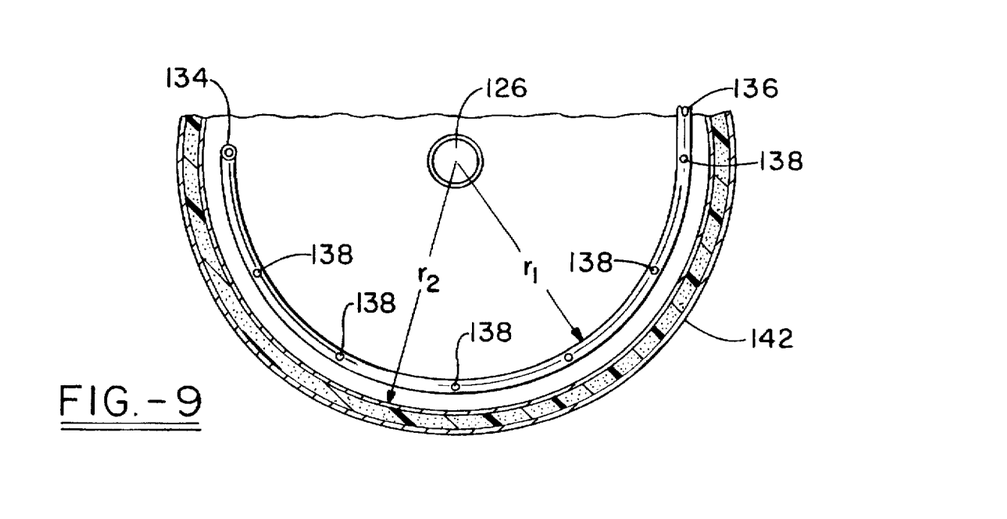
FIG. 9 is a sectional view as may be taken along line 9—9 of FIG. 8.

Mounted in through the tank top (130) is cold water inlet tube (114) which feeds the proximal end (144) of water heater tube (118). This tube extends lengthwise to the bottom of the tank in an essentially parallel fashion until it approaches the lower portion of tank chamber (128). As water heater tube (118) approaches this lower portion of the tank chamber, its path begins to divert in a plane essentially normal to the longitudinal axis at inflection point (134). This inflection is subsequently bent in an essentially circular fashion with the radius of curvature ($r_1$) of the water heater tube (118) being smaller than the radius ($r_2$) of the inside of the water heater tank as best seen in FIG. 9. This lower curved portion of water heater tube (118) contains a plurality of apertures (138) disposed therein to permit the egress of the cold water into the bottom of the tank in that distal end (136) of water heater tube (118) is generally fused closed by heating that portion of the tube to above its glass transition temperature and causing the tubular opening to mold shut.

The proximal end (144) of water heater tube (118) is configured so as to provide a leak-tight fitting with cold water inlet tube (114). This tubing end is prepared in accordance with the teachings of co-pending patent application U.S. Ser. No. 08/327,028 filed (Oct. 21, 1994) claiming priority on U.S. Ser. No. 08/062,848 filed (May 14, 1993) and is fabricated so as to maintain the thickness (t) of the wall diameter of the tube even though the initial tube diameter ($d_1$) is expanded to a larger diameter ($d_2$), the teachings of which are fully incorporated by reference.

In order to achieve a proper change in direction at inflection point (134), at least a portion of the tube, both above and below the position of the inflection point is heated, e.g., in an oil bath, to a temperature that allows the tube to permanently bend in a mold so as the curvature is formed hot and cooled. Depending on the material used, this temperature can range from 212° F. to 450° F., but in a preferred embodiment, ranges from 275° F. to 335° F. At the proper temperature, the tube curvature is formed and held in place in the mold and subsequently cooled. A variety of molds and fixtures are used to accomplish this objective, the precise configuration of which are determined by the end application of the product.

Depending upon the equipment available, the polyolefin (e.g., polyethylene) tubing is crosslinked using conventional means known to those skilled in the art (e.g., silane, radiation, etc.), prior to the fabrication procedure described in this application. If economical, the finished tube could also be crosslinked with radiation. The material is typically crosslinked to at least 60%, with amounts as high as 85% being possible. Cost usually decides which crosslinking method needs to be used to provide a given quality of tubing. The benefit of crosslinking the polyethylene subsequent to the fabrication steps described in the application is that a chemical material bond is formed during the end-forming compression molding processes, resulting in a stronger product. However, there may be applications where this type of end-forming is not essential, thereby permitting the use of previously crosslinked material during the fabrication procedure. Previously crosslinked material has a much better hot melt strength since the crosslinking gives it more structure. This makes forming easier. However, the crosslinked material will not chemically bond to itself even when heated to the clear state. This does mean that the material in the formed ends is not completely sealed upon itself, but molded in place with pressure.

Crosslinking can of course, be accomplished in many different ways. Most crosslinking is done in the extrusion process, specifically by the Engel process, the silane process or the peroxide process. Each process has a crosslinking catalyst that causes the polymer to crosslink when certain temperature, humidity and pressure are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. Most parts are usually accomplished using straight tubes. The extrusions after crosslinking by any method can then be fabricated. In one embodiment of this invention, the processing sequence involves bending the tube to the correct configuration, drilling the holes, compressing the distal end, and molding the proximal end with a key way. However, this does not represent the only embodiment contemplated within the invention. It is envisioned that under some circumstances, it would be appropriate to crosslink the final product. While the sequencing of the above mentioned processing steps is generally not critical, certain aspects do need to be performed in sequence, i.e., the steps used in the belling sequence discussed previously in this application.

Subsequent to the crosslinking step, at least one hole, and preferably a plurality of holes are drilled into the tube to permit the egress of water into the tank. The holes are drilled into the side of the water heater tube which is positioned above the bottom of the tank in order to maximize the sediment disturbing properties of the egress of the cold water as it flows into the tank and to deposit the colder water over the heating coil, although it is possible to have the holes drilled into any side of the tubing, depending upon the manufacturer's specifications.

Forming the tubing in accordance with the procedure described in detail below will overcome the problems of the prior art which have taught (1) spin-welding a separately molded bulb onto the outer diameter (O.D.) of the end of a tube; or (2) insert molding a bulb onto the O.D. of the end of a tube; or (3) forming a flange on the O.D. of the tube and inserting a separately molded neoprene or like concave washer on the flange for sealing purposes. All such processes have cost and performance drawbacks. Most require separately molded parts which must be joined to the tubing in assembly operations. Moreover, a two-part tubing end cap or bulb sealing construction does not have the performance integrity or the expected useful life of the tubing itself. In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, the same interface leakage susceptibility is present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, which can separate from the tube.

The best mode for carrying out the invention will now be described for the purposes of illustrating the best mode known to the applicant at the time. The examples are illustrative only and not meant to limit the invention, as measured by the scope and spirit of the claims.

EXAMPLE #1

Preparation of a belled end of a connector from a cylindrical rod of uniform thickness During the process for forming a belled tubular end of a connector, the belled end of the connector having at least the same wall thickness as the main body of the hollow cylindrical tube from which it was prepared, the following steps were employed. One end of a hollow cylindrical tube of constant thickness and constant internal and external diameter, was partially placed on an elongated male die projection of a male die, the projection of the male die closely conforming to the first internal diameter of the tubular connector. The configuration of the male die included an annulus-shaped recess which increased from the first internal diameter of the hollow cylindrical tube to the second internal diameter of the belled end and correspondingly increased from the first outer diameter to the second outer diameter so as to maintain the thickness constant. The male die projection projected axially and concentrically. Surrounding the first outer diameter of the tubular connector was a female die, which included a recess adapted to cooperate with the recess of the male die.

The dies where the belled end was to be formed were held apart, while the portion which would form the belled end which projected from the female die, was placed at least partially on the male die projection. A portion of the tubular connector which was projecting from the female die was heated sufficiently to make such projecting portion pliable enough to form and flow under melt flow conditions. When the connector is made of polyethylene, the temperature of this step is about 700° F. for about 15–35 seconds. The heated portion of the tubular connector was physically pushed into the belled end of the cooperating recesses under the melt flow conditions so as to produce a uniform thickness belled end. Typically, the additional step of cooling the tubular connector occurs at this point in the process, typically by cooling at least one of the dies after they are brought together.

Discussion

What has been described is a thermoset rather than a thermoplastic water heater tube which has a much higher heat distortion temperature when compared to standard thermoplastic materials such as polypropylene, polyethylene or PVC. The stress crack resistance is higher as is the dimensional stability. These desirable properties can be achieved by using a lower cost material, in contrast to a more expensive thermoplastic, i.e., polysulfone. One additional benefit resulting by changing from polysulfone to polyethylene, is that the extrusion temperature can be reduced from about 550° C. to about 320° C., thereby additionally saving on energy heating requirements.

Through the processing described above, a superior product can be fabricated at a lower price than that possible using a standard thermoset, which could not have been processed in a similar manner (thermosets cannot be extruded). The invention utilizes thermoplastic processing conditions, with subsequent crosslinking to form a thermoset. This combines the best features of both types of materials: (1) the ease of thermoplastic processing; combined with (2) the desirable physical properties of a thermoset.

Thus, what is shown in this application is that through process modifications, the limitations inherent in polyethylene, polypropylene, and polybutylene have been overcome. Polyethylene is a low cost product that is easy to process, but suffers from low temperature resistance, low burst strength and poor creep resistance. It does have good flexibility. Polypropylene is of moderate cost and also is easy to process. It however, has poor cold weather impact, poor creep resistance, poor burst strength and poor flexibility. Polybutylene is high cost and difficult to process, but has good cold weather impact, good creep, good burst strength, but suffers from poor flexibility.

By working with a medium density polyethylene, which is of low cost, easy processing, good flexibility, but marginal cold impact and poor burst, and crosslinking the material to over 65%, the resulting product possesses good creep, good flexibility, good burst strength, good cold weather impact, significantly lower cost than polybutylene, and with a higher heat distortion temperature with double the life expectancy of polybutylene. The key with forming the ends resides in the processing which occurs when the material is crosslinked, since it becomes a thermoset as opposed to a thermoplastic when it was extruded. In order to overcome this limitation, the molding temperatures were increased due to higher processing temperature, pressure was added because material must be formed over itself, which is pliable, but which does not stick to itself. When crosslinked to 65%, only 35% remains to bond. The amount of pressure is dependent upon the material which is being processed, the exact number of pounds pressure being varied until the molded product uniformly fills the mold. Scrap is not reprocessable, so operations must be more exact, and the tubing must be constantly checked to be sure that the crosslinking has taken place.

By combining the innovation of extruding then radiating, superior properties have been developed at a competitive cost. By combining all of the above, a completely different product is formed which is a thermoset rather than a thermoplastic.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for forming a thermoset hollow cylindrical water heater tube having one belled proximal end without wall thinning from a constant thickness portion of the tube and an opposed distal end, comprising without regard to order of steps (a) through (e):
   (a) belling the proximal tube end comprising the steps in the following order of:
      (i) inserting the proximal tube end through a female die and having a portion of the tube projecting the female die, the female die surrounding a first outer diameter of the tube and having a projection adapted to cooperate with a recess of a male die;
      (ii) heating at least a portion of the tube projecting from the female die sufficiently to make such projecting portion pliable enough to form; and
      (iii) belling the proximal tube end by insertion of the projecting tube portion into an annular recess of the male die and the cooperating recess of the male die and the projection of the female die by closing the female and male dies;
   (b) heating a portion of the tube at an inflection region between the proximal and distal ends of the tube and bending the tube;
   (c) at least partially sealing the distal end of the tube;
   (d) crosslinking the tube; and
   (e) drilling at least one hole into a wall of the tube.

2. The process of claim 1 wherein the tube is polyethylene and a temperature of the step of heating the portion of the tube projecting from the female die is about 275°–335° F. for about 20–30 seconds.

3. The process of claim 2 which further comprises a step of cooling the tube after the step of heating the portion of the tube projecting from the female die.

4. The process of claim 3 which further comprises a step of physically pushing the tube into the male and female dies under melt flow conditions so as to uniformly fill the cooperating recess of the male die and the projection of the female die.

5. The process of claim 4 which further includes the step of cooling at least one of the dies after they are brought together in the step of belling one end of the tube by insertion into the cooperating recess of the male die and the projection of the female die.

6. The process of claim 1 wherein the step of heating a portion of the tube at the inflection region is at a temperature of between 212° F. to 450° F.

7. The process of claim 6 wherein the step of heating a portion of the tube at the inflection region is at a temperature of between 275° F. to 335° F.

8. The process of claim 1 wherein the step of drilling comprises drilling two or more holes, at least a majority of the two or more holes being positioned to face a bottom surface of a water tank.

9. The process of claim 1 wherein the step of crosslinking the tube occurs after the step of belling a tube end.

10. The process of claim 1 wherein the step of crosslinking the robe is the first step of the process.

11. The process of claim 1 wherein the step of crosslinking is effected by a crosslinking process, said process being selected from the group consisting of an Engel process, a silane process, a peroxide process and an irradiation process.

12. The process of claim 1 wherein the step of belling further comprises placing an end of the tube having a first internal diameter and a first outer diameter and a thickness as measured as a difference between the first internal diameter and the first outer diameter of the tube, at least partially on an elongated male die projection of the male die with the projection closely conforming to the first internal diameter of the tube, pushing the tube into the male die having an annulus-shaped recess which increases in cross-section so as to at least maintain the thickness of the tube.

13. The process of claim 1 wherein the step of at least partially sealing the distal end of the tube comprises heating a distal portion of the tube to a softening point of the tube followed by compressing a side of the tube onto an opposed side of the tube so as to at least partially seal the distal end of the tube.

14. The process of claim 13 wherein the step of at least partially sealing the distal end of the tube further comprises compressing the side of the tube onto the opposed side of the tube so as to seal off the distal end of the tube.

15. A process for forming a thermoset hollow cylindrical water heater tube having one belled proximal end without wall thinning from a constant thickness portion of the tube and an opposed distal end, comprising, without regard to order of steps (a) through (e):

(a) belling the proximal tube end comprising the steps in the following order of:
  (i) heating at least a portion of the tube projecting from a female die sufficiently to make such projecting portion pliable enough to form, the female die surrounding a first outer diameter of the tube and having a projection adapted to cooperate with a recess of a male die; and
  (ii) belling the proximal tube end by insertion of the projecting tube portion into an annular recess of the male die and forming the belled end of the tube under melt flow conditions through the cooperating recess of the male die and the projection of the female die by closing the female and male dies;

(b) heating a portion of the tube at an inflection region between the proximal and distal ends of the tube and bending of the tube;

(c) at least partially sealing the distal end the tube;

(d) crosslinking the tube; and (e) drilling at least one hole into a wall of the tube.

16. The process of claim 15 wherein the tube is polyethylene and a temperature of the step of heating the portion of the tube projecting from the female die is about 275°–335° F. for about 20–30 seconds.

17. The process of claim 16 which further comprises the step of cooling the tube after the step of heating the portion of the tube projecting from the female die.

18. The process of claim 17 which further includes the step of cooling at least one of the dies after they are brought together in the step of belling one end of the tube by insertion into the cooperating recess of the male die and the projection of the female die.

19. The process of claim 15 wherein the step of heating a portion of the tube at the inflection region is at a temperature of between 212° F. to 450° F.

20. The process of claim 19 wherein the step of heating a portion of the tube at the inflection region is at a temperature of between 275° F. to 335° F.

21. The process of claim 15 wherein the step of drilling comprises drilling two or more holes, at least a majority of the two or more holes being positioned to face a bottom surface of a water tank.

22. The process of claim 15 wherein the step of crosslinking the tube occurs after the step of belling a tube end.

23. The process of claim 15 wherein the step of crosslinking is effected by a crosslinking process, said process being selected from the group consisting of an Engel process, a silane process, a peroxide process and an irradiation process.

24. The process of claim. 15 wherein the step of belling further comprises
  placing an end of the tube having a first internal diameter and a first outer diameter and a thickness as measured as a difference between the first internal diameter and the first outer diameter of the tube, at least partially on an elongated male die projection of the male die with the projection closely conforming to the first internal diameter of the tube, pushing the tube into the male die having an annulus-shaped recess which increases in cross-section so as to at least maintain the thickness of the tube.

25. The process of claim 15 wherein the step of at least partially sealing the distal end of the tube comprises heating a distal portion of the tube to a softening point of the tube followed by compressing a side of the tube onto an opposed side of the tube so as to at least partially seal the distal end of the tube.

26. The process of claim 15 wherein the step of at least partially sealing the distal end of the tube further comprises compressing the side of the tube onto the opposed side of the tube so as to seal off the distal end of the tube.

* * * * *